United States Patent
Schander et al.

[11] Patent Number: 6,148,690
[45] Date of Patent: Nov. 21, 2000

[54] CAM FOLLOWER MOUNTING ASSEMBLY

[75] Inventors: Craig Schander, Libertyville; Lou M. Wozniak, Arlington Heights, both of Ill.; Gary Sullwold, Valparaiso, Ind.; Kevin Mues, Valparaiso, Ind.; Patrick Tibbits, Valparaiso, Ind.

[73] Assignee: Emerson Electric Company, St. Louis, Mo.

[21] Appl. No.: 09/266,970

[22] Filed: Mar. 12, 1999

[51] Int. Cl.⁷ .................................................. F16H 53/06
[52] U.S. Cl. .............................................. 74/569; 403/362
[58] Field of Search ................................ 74/569; 403/362

[56] References Cited

U.S. PATENT DOCUMENTS

| | | | |
|---|---|---|---|
| 3,347,110 | 10/1967 | Wilson | 403/362 |
| 3,479,072 | 11/1969 | Kosar | 403/362 |
| 3,538,895 | 11/1970 | Jensen et al. | 74/569 |
| 3,611,846 | 10/1971 | Jeanneret . | |
| 3,806,267 | 4/1974 | Vining, Jr. | 403/362 |
| 4,293,118 | 10/1981 | Olson et al. . | |
| 4,379,415 | 4/1983 | Klancnik et al. . | |
| 4,445,529 | 5/1984 | Lagarelli | 403/362 |
| 4,932,274 | 6/1990 | Jones . | |
| 5,269,118 | 12/1993 | Bullaro | 403/362 |

FOREIGN PATENT DOCUMENTS 2 105 225    3/1983    United Kingdom .

*Primary Examiner*—Dirk Wright
*Attorney, Agent, or Firm*—Tilton, Fallon, Lungmus & Chestnut

[57] ABSTRACT

A cam follower mounting assembly in which a cam follower has a cam follower stud that is not threadedly mounted to a mounting plate, but rather, is secured to the mounting plate via a set screw having a spherical tip that securably interfaces with a complementary annular groove in the cam follower stud. The annular groove is located near an end of the cam follower stud opposite the follower wheel.

10 Claims, 1 Drawing Sheet

CAM FOLLOWER MOUNTING ASSEMBLY

FIELD OF THE INVENTION

The present invention relates generally to mounting of cam followers relative to a mounting member, such as, for example, a rotary index drive output mounting plate, and, more particularly, to a cam follower mounting assembly that maintains proper orientation of cam followers relative to a mounting member.

BACKGROUND OF THE INVENTION

Cam driven rotary index drives are employed to repeatedly move objects from one position to another position while achieving better accuracy, higher load capacity, and lower maintenance as compared with more conventional methods of manipulating an object's position, such as the pawl and ratchet. Cam driven rotary index drives typically include an indexer output mounting plate connected to a machine component which is to be indexed in rotary increments. The indexer output mounting plate includes several cam followers arranged in a circular array in order to cooperate with one or more cam tracks of an adjacent precision cam as the cam is rotated. The cam tracks are configured to impart a predetermined rotary indexing motion to the indexer output mounting plate via interaction with the cam followers as the cam is rotated.

A cam follower typically includes a cylindrical mounting shaft having a rotatable cam follower shell or member supported by anti-friction bearings on one end of the shaft for engaging the cam track. One conventional method of securing the cam follower to an indexer output mounting plate is to provide external threads on the end of the mounting shaft opposite the rotatable cam follower shell, and fastening the mounting shaft in an internally threaded bore in the mounting plate. Another conventional method would be to attach a locking nut onto the external threads of the cam follower mounting shaft and screw down until the locking nut meets the indexer output mounting plate surface.

This method suffered from a serious shortcoming, in that the face of the locking nut is generally not perfectly perpendicular to the axis of the cam follower mounting shaft. As a result, tightening of the locking nut tends to undesirably bend the cam follower mounting shaft, making it difficult for the cam follower wheel to ride squarely within an associated cam track. In order to overcome this problem, it is necessary to go to additional time and expense to machine down the face of the locking nut.

An alternate known method for securing a cam follower to an indexer output mounting plate disclosed in U.S. Pat. No. 5,724,861, utilizes an internally threaded bore within the mounting shaft at the end of the mounting shaft opposite the rotatable cam follower shell. An externally-threaded mounting screw extends through the indexer output mounting plate, and is threadably received in the threaded bore of the cam follower mounting shaft. A washer is disposed between the screw and the end of the cam follower mounting shaft having the internally threaded bore.

Although these various methods may be suitable for securing average-sized cam and larger followers in mounting plates, there are still several shortcomings associated with them. First, the rotation of the cam causes a reversing axial force on the cam follower that tends to pull the cam follower out from the bore in the mounting plate, or push the cam follower too far into the bore in the mounting plate. This axial force can be a result of misalignment of the cam to the follower, relative slip of the follower to the cam track, or lack of perpendicularity of the cam track itself. Although the methods mentioned above do provide some means of distributing such forces, it would be desirable to have a more effective way to prevent premature dislodging of a cam follower from a mounting plate. Also, neither internally nor externally thread mounting shafts are practicable with small-sized cam followers. Machining of threads to tight tolerances becomes more difficult and, in cases of particularly small cam followers, cost prohibitive.

An additional shortcoming of prior art cam followers is the cost associated with the material required for the relatively long stud shaft section and relatively large nut portion. It would be beneficial to provide a secure mounting assembly for cam followers that do not have such large, costly material requirements.

Cam followers are measured in units of inches, and a typical follower size is about 2 inches in diameter, with a length of about 3 inches. However, smaller-sized cam followers, such as generally ranging from about 1 inch diameter, down to about 0.276 inch diameter, are more suitable for certain cam index drive systems, such as index drive systems used for electronic production systems, or inspection/quality control systems. It would further be desirable to have a reliable way to secure such small-sized cam followers in their respective output mounting plates.

SUMMARY OF THE INVENTION

The cam follower mounting assembly of the present invention uses a combination of an annular groove located in the cylindrical mounting shaft of the cam follower (sometimes referred to by those of ordinary skill in the art as the cam follower stud), and a spherical-tipped set screw securably mounted in a threaded channel appropriately positioned in the mounting plate so as to communicate with the bore that receives the mounting shaft. The annular groove is adapted to securably receive the spherical tip of the set screw, with the desired result that the cam follower is reliably secured within the bore of the indexer output mounting plate.

In order to facilitate installation, as well as permit removal of cam followers, the threaded channel in the mounting plate not only communicates with the bore that receives the cam follower, but also has an opening accessible from outside the mounting plate. A cavity in the distal or rear end of the set screw, i.e. opposite the screw's spherical-tipped end, can be adapted to receive a tool, such as an allen wrench, to further assist a technician in installing or removing the cam follower. Installation of a cam follower is easily accomplished by inserting the mounting shaft into the bore, and tightening the set screw to bring the spherical-tipped end into interference contact with the shaft's annular groove. By loosening the set screw, one can retract the spherical-tipped end away from the annular groove in the mounting shaft.

Routine maintenance of index cam drives typically requires that cam followers be replaced, as they tend to wear down over time due to friction. The cam follower can be removed, after the spherical-tipped end of the set screw is retracted from the annular groove, preferably by inserting a screw in a tapped aperture provided in a first end of the cam follower mounting shaft, and continuing to rotate the screw even after it reaches the end of its travel in the threads of the tapped aperture. This technique is useful in order to overcome an interference fit between the cam follower mounting shaft and the corresponding bore of the mounting plate.

DETAILED DESCRIPTION OF THE INVENTION

Figure 1:
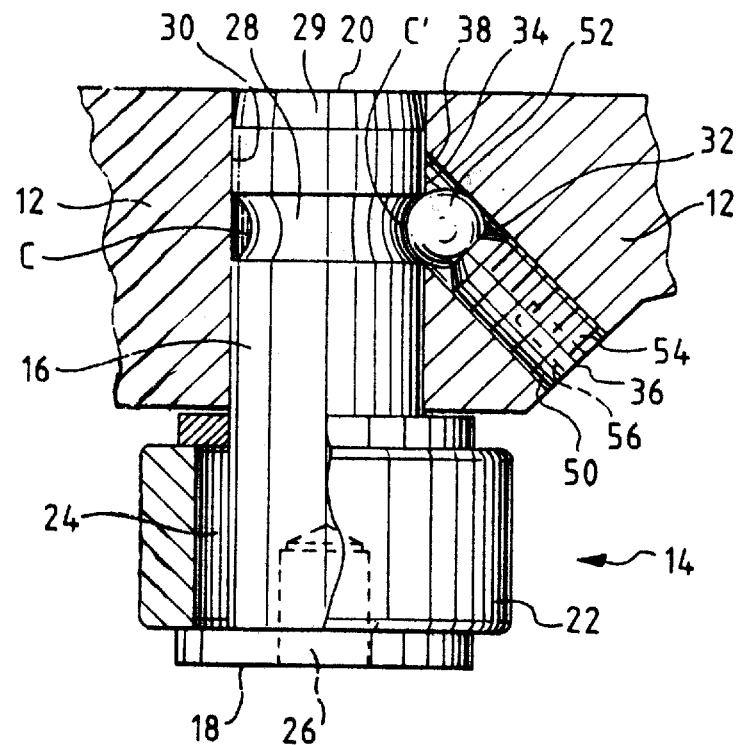
FIG. 1 is a front view of the improved cam follower mounting assembly of the present invention.

Referring to FIG. 1, a cut-away section of a mounting plate or member 12 for a cam-driven index system is shown. A cam follower 14 is shown having a cam follower stud, or cylindrical mounting shaft 16 having a first shaft end 18 and a second shaft end 20, and a cam follower shell or wheel 22 rotatably supported on the first shaft end 18 by anti-friction bearings 24, such as grease packed roller bearings. The first shaft end 18 can include a tapped, internally threaded aperture 26 for receiving a screw (not shown). As described in more detail below, the insertion of a screw in the tapped, internally threaded aperture 26 is useful to assist in removal of the cam follower 14 when desired. The rotatably-mounted wheel or follower shell 22 is preferably spaced about 0.015 inch from the mounting plate 12 when the cam follower 14 is properly secured to the mounting plate 12. The cam follower mounting shaft 16 also includes an annular groove 28 having a radius of curvature R. The annular groove 28 is preferably located toward the second end 20 of the shaft, i.e. the end of the shaft opposite the cam follower shell 22. The cam follower shaft may have an inward taper portion 29 at the second end 20.

The location of the annular groove 28, i.e. toward the second end 20 of the cam follower mounting shaft 16, is most preferably an optimum position to minimize local stresses imparted to the cam follower mounting shaft 16. The shape of the groove also contributes to minimizing such stresses.

The mounting plate 12 includes a cylindrical bore 30 to receive each cam follower 14. Each bore 30 is sized to receive a mounting shaft 16 with close tolerance (e.g. ±0.0002 inch). For each cam follower receiving cylindrical bore 30, the mounting plate 12 also includes a threaded channel 32 having a first open end 34 in communication with the cylindrical bore 30 and a second open end 36 accessible from outside the mounting plate 12. The threaded channel 32 is sized to receive a spherical-tipped set screw 50. The spherical tip end 52 of the set screw 50 is adapted to fit in the annular groove 28 in the mounting shaft 16, and when a cam follower 14 is fully inserted in the cylindrical bore 30, the annular groove 28 is located adjacent the first open end 34 of the threaded channel 32. Most preferably, the spherical tip end 52 has a maximum diameter of about 3 mm, with a curvature C' which is substantially equal to the radius of curvature C of the annular groove 28, within a tolerance of ±0.005 inch, so as to reliably secure the cam follower 14 in the cylindrical bore 30.

When the cam follower 14 is fastened in place within the cylindrical bore 30 by the set screw 50, undesirable axial forces, as may be exerted on the cam follower 14 by an associated drive cam (not shown), will be constrained by the set screw 50, such that premature dislocation of the cam follower 14 from the cylindrical bore 30 is prevented.

In one sample made in accordance with the present invention, the curvatures C and C' each had a radius of approximately 0.110 inch.

Figure 2:
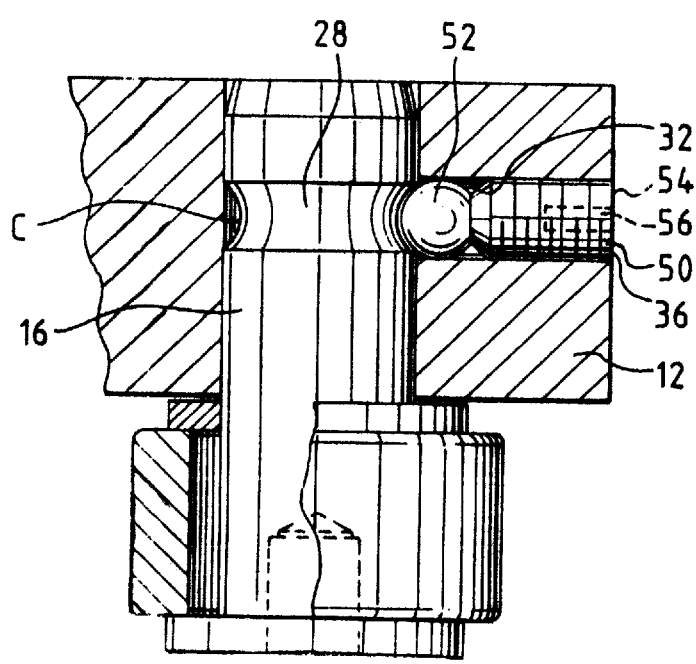
FIG. 2 is a front view of an alternate embodiment of the improved cam follower mounting assembly of the present invention.

The threaded channel 32 may be positioned at an acute angle relative to the cylindrical bore 30, as shown in FIG. 1, or, alternatively, may be positioned perpendicular to the cylindrical bore 30, as shown in FIG. 2. Although the angle of the threaded channel 32 relative to the cylindrical bore 30 may range from 45° to 90°, the angle preferably should be in the range from 60° to 90°, with the preferred angle being 90°. It is found that when an angle less than 45° or greater than 90° is utilized, significantly greater forces on the set screw 50 are required in order to hold the cam follower 14 in place, thus, such angles are considered to be less-preferred. The distal end 54 of the spherical-tipped set screw 50, i.e. the end opposite the spherical tip end 52, may be provided with a cavity 56 having an hexagonal or other polygonal shape to receive a drive tool such as an allen wrench (not shown). The cavity 56 facilitates tightening or loosening the set screw 50 within the threaded channel 32 for installing or removing a cam follower.

It is understood that there are various methods of installing a cam follower in the cam follower mounting assembly of the present invention. For example, one can fully insert a cam follower mounting shaft 16 into the cylindrical bore 30 so that the annular groove 28 is positioned adjacent the first open end 34 of the threaded channel 32. Then, the spherical-tipped set screw 50 can be inserted in the threaded channel 32 and tightened by inserting a tool into the cavity 56, until the spherical tip end 52 engages the annular groove 28.

Alternatively, the set screw 50 may be initially positioned such that the spherical tip end 52 extends at least partially into the cylindrical bore 30. When the cam follower 14 is inserted in the mounting plate 12, the user (not shown) installing the cam follower 14 will feel the cam follower mounting shaft 16 snap into proper position as the wall 38 of the mounting shaft 16 passes over the spherical tip end 52 of the set screw 50, and the spherical tip 52 comes to rest in the annular groove 28. The set screw 50 can then be tightened, again by inserting an alien wrench or other appropriate tool in the cavity 56, in order to ensure the cam follower 14 is secured in the cylindrical bore 30. The inward tapered portion 29 at the second shaft end 20 of the mounting shaft 16 is particularly desirable for this method, as it helps guide the spherical tip 52 of the set screw 50 over the wall 38 of the mounting shaft 16.

Advantageously, no lubricant is needed in the annular groove 28 or in the cylindrical bores 30 of the mounting plate 12. Preferably, an interference fit is utilized between the mounting shaft 16 of the cam follower 14 and the corresponding cylindrical bore 30. Thus, some force may be required to insert or remove the cam follower 14, but such an interference fit is desirable to contribute to securement of the cam follower 14 within the cylindrical bore 30.

Over time, cam followers can be expected to wear down due to friction. Regular maintenance of cam indexing systems therefore dictates occasional replacement of cam followers. Also, in order to increase dwell time, i.e. the period during which a precision cam (not shown) is not engaging a cam follower 14, and thus not indexing the mounting plate 12, one option is to remove one or more cam followers 14 from the mounting plate 12. The present invention provides for easy removal of a cam follower, whether for replacement or repair of cam followers, or for changing a motion cycle pattern for an indexing system. By inserting an appropriate tool such as an allen wrench (not shown) into the cavity 56 and loosening the set screw 50, the spherical tip end 52 retracts away from the annular groove 28 and the cam follower 14 can then be removed from the cylindrical bore 30. In order to overcome the interference fit between the mounting shaft 16 of the cam follower 14 and the cylindrical bore 30, it is helpful to insert a screw (not shown) into the tapped, internally threaded aperture 26 in the first shaft end 18 of the cam follower 14. Once the external threads of the screw reach the end of its travel in the internal threads of the aperture 26, continued rotation of the screw rotates the entire cam follower 14, facilitating removal of the cam follower 14 from the cylindrical bore 30. Alternatively, if the second shaft end 20 of the cam follower 14 is accessible, pressure can be applied directly to the second shaft end 20 in order to overcome the interference fit between the mounting shaft 16 and the cylindrical bore 30 to facilitate removal of the cam follower 14.

Although the invention has been described with respect to certain embodiments thereof, those skilled in the art will understand that it is not intended to be limited thereto and that changes and modifications can be made therein within the scope of the appended claims.

We claim:

1. An improved cam follower mounting assembly in combination with a mounting member having first and second cam follower mounting surfaces and a bore between said mounting surfaces, and a cam follower having a mounting shaft received in said bore and defining a longitudinal shaft axis, said mounting shaft having a cam follower member rotatably disposed on a first shaft end proximate said first cam follower mounting surface and a second shaft end proximate said second cam follower mounting surface, wherein the improvement comprises:

a threaded cylindrical channel disposed between said mounting surfaces and having one opening in communication with said bore;

an annular groove in said longitudinal shaft axis, said annular groove disposed adjacent said opening of the threaded cylindrical cavity; and a threaded set screw secured in said threaded cylindrical cavity, said set screw having a substantially spherical tip in communication with said annular groove of said longitudinal shaft axis, whereby forces exerted upon said shaft axis by said cam follower interacting with a cam are distributed by said set screw and said cam follower is secured within said bore.

2. The improved cam follower mounting assembly of claim 1, wherein said threaded channel is internally threaded and said set screw is externally threaded.

3. The improved cam follower mounting assembly of claim 1, wherein said threaded channel is disposed at an angle of at least 45° and at most 90° relative to said bore.

4. The improved cam follower mounting assembly of claim 3, wherein said angle is about 90°.

5. The improved cam follower mounting assembly of claim 3, wherein said angle is about 60°.

6. The improved cam follower mounting assembly of claim 1, wherein an interference fit is provided between said mounting shaft and said bore of the mounting member, said interference fit cooperating with said annular channel and said set screw to secure said cam follower within said bore.

7. The improved cam follower mounting assembly of claim 1, wherein said threaded channel further has an opening in communication with an exterior sidewall of said mounting member.

8. The improved cam follower mounting assembly of claim 7, wherein said set screw further includes a cavity in an end opposite said substantially spherical tip, said cavity being adapted to receive a tool to facilitate installation of said set screw in said threaded channel.

9. The improved cam follower mounting assembly of claim 7, wherein in order to overcome said interference fit when removing the cam follower from the bore, a threaded aperture is provided in said first shaft end.

10. The improved cam follower mounting assembly of claim 7, wherein said second shaft end is accessible from the direction of the second cam follower mounting surface, whereby pressure can be applied to the second shaft end to overcome said interference fit when removing the cam follower from the bore.

* * * * *